Nov. 10, 1970     E. A. ZADIG     3,538,622

TEACHING DEVICE

Filed Jan. 29, 1968

INVENTOR.
Ernest A. Zadig

United States Patent Office 3,538,622
Patented Nov. 10, 1970

3,538,622
TEACHING DEVICE
Ernest A. Zadig, 15 W. 72nd St.,
New York, N.Y. 10023
Filed Jan. 29, 1968, Ser. No. 701,330
Int. Cl. G09b 7/12
U.S. Cl. 35—9                                                5 Claims

ABSTRACT OF THE DISCLOSURE

A teaching system comprises a teaching film having thereon in successive frames indicia such as instructions or lesson material and questions and multiple answers relating thereto, and a viewer in which the film is exhibited and transported. The film may be advanced continuously while the student is reading a lesson and then stopped and advanced again in response to the student's selection of the correct one of several button switches associated with the answers respectively. If there are a plurality of questions the film will be stopped for each question and restarted by the selection of the correct answer selection means. The film may be shipped by mail in a film magazine which is inserted in the viewer which is thereby loaded for transport of the film. Selection of any one of the alternative answer selection means actuates recording means showing in each case whether a correct or incorrect selection has been made. Selection of the correct answer button switch actuates other means controlling the recording means so that a correct answer selection is recorded.

---

Figure 1:
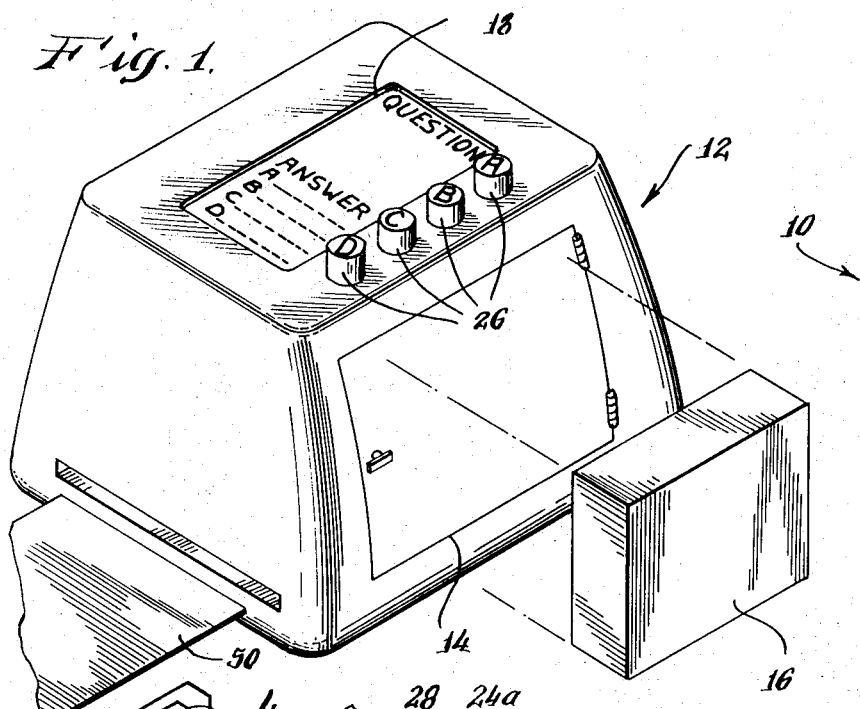

This invention relates to a teaching system comprising a combination of a teaching film having indicia such as lessons and questions, and multiple answers for each question, and a housing in which the film is inserted, transported, and exhibited to a student. The film may be run as a motion picture or as an individual still picture while exhibiting the lesson and then be stopped when a question is presented and restarted in each instance when the student selects and depresses the one of several button switches which is associated with the correct answer. The student is thus informed by whether the film restarts moving or not whether the answer he has selected is correct or incorrect. In addition a card or the like is marked each time an answer selection is made, recording whether the selection made is correct or incorrect.

The housing in which the teaching film is exhibited is referred to herein as a "viewer."

If desired separate lessons or series of lessons may be supplied in the form of a film pack or magazine ready to be inserted in a viewer with the film mounted on rollers adapted to coact with means well known in the art for advancing the film. While not limited to such use the system is well adapted for teaching students in their own homes. Students equipped with viewers, which can be supplied at low cost if made in substantial numbers, can be supplied wth teaching films sent through the mails, daily or weekly, for example, to be studied at home by students through their individual viewers. It is contemplated that a lesson will comprise at least one question and a choice of answers and that the student will make his answer selection by depressing one of several buttons associated with the respective multiple answers and will learn in the process because, if the selected answer is correct, the film will advance to the next question or to the next lesson, but if the selected answer is incorrect the film will not move forward, but will back track to less advanced study material. It is further contemplated that simultaneously a record will be made of correct and incorrect answers, preferably by marking a permanent report card which could be given or mailed to an instructor.

An object of the invention is to provide a system of programmed instruction for students individually, which can be used either in a class room, or by students studying at home.

Another object of the invention is to provide in combination with a teaching film, apparatus adapted for displaying a lesson, or a series of lessons in proper order, and providing means by which the student can indicate his choice of multiple answers to questions related to a lesson, with resultant instruction to the student due to indication that the selected answer is correct or incorrect, and also providing a record as to each answer selection, differentiating between correct and incorrect answer selections.

Another object of the invention is to provide an improved system of teaching according to which lessons on film in small film magazines can be sent through the mails to be studied at home by students equipped with a device adapted to receive the film magazine and support the film on transport means and to actuate the transport means in such a way as to inform a student as to the correctness or incorrectness of each answer selection.

Figure 2:
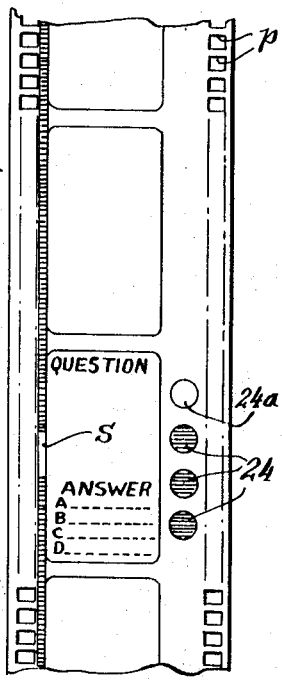
Figure 3:
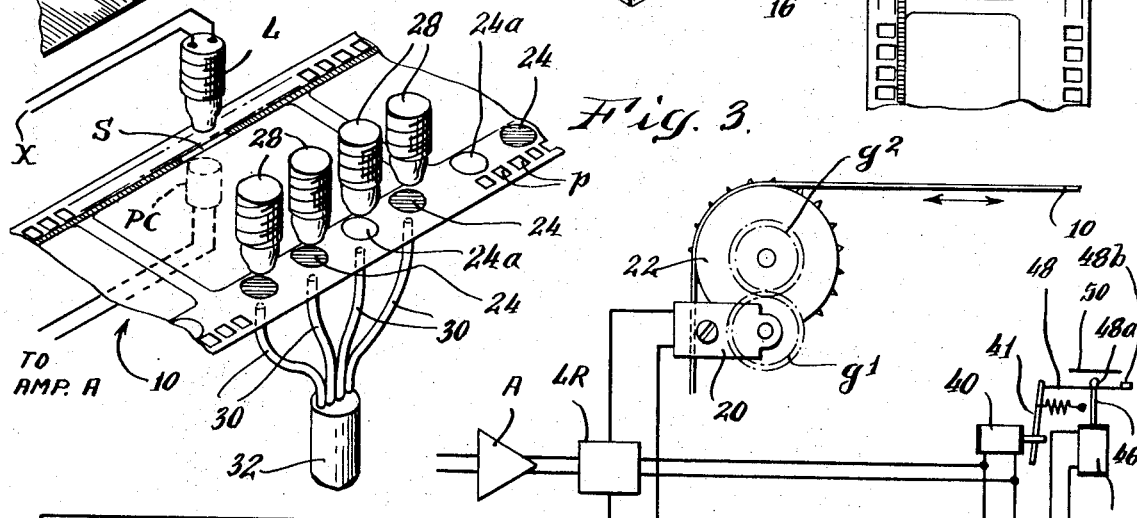
Figure 4:
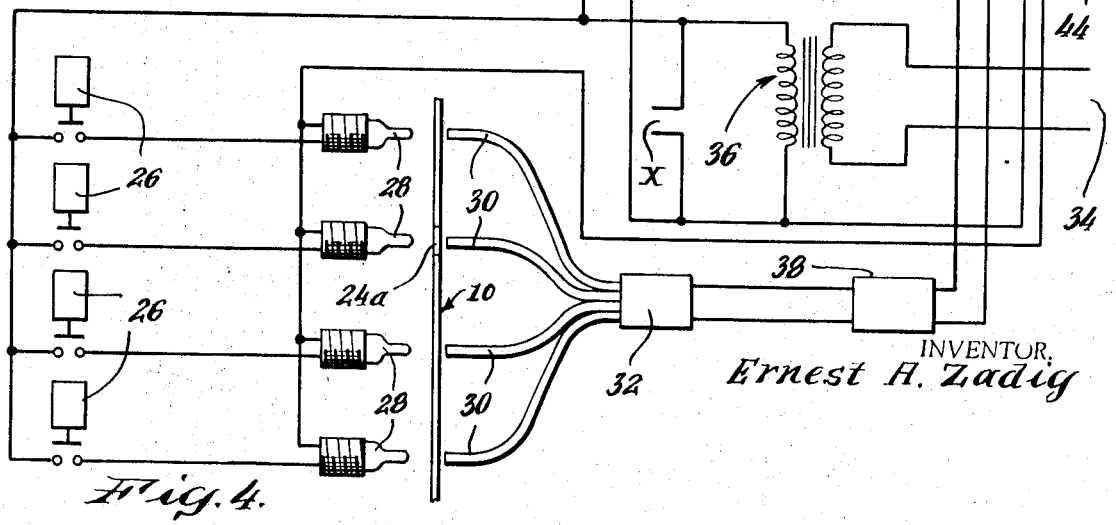

The invention will best be understood by reading the following description in connection with the drawings in which, FIG. 1 is an isometric view showing a film magazine or pack and a viewer adapted to receive the film magazine therein, FIG. 2 is a top plan view of a teaching film on which indicia, which may comprise lessons and related questions and multiple answers, are provided in successive frames, and on which a row of circles are provided along one margin of the film in association with the multiple choice answers individually, one of the circles, which is related to the correct answer, being transparent, and on which an interrupted opaque band for stopping the film is provided along the other margin, FIG. 3 is an isometric view of a portion of the film such as is shown in FIG. 2 with the stop space along one margin coacting with a light source and light sensitive means to trigger means for stopping the travel of the film, and with a number of light sources disposed above the other margin of the film in alignment respectively with areas shown as circles along the other margin of the film, one of which allows light to pass through, and with a number of light guides disposed below the film and all leading to a photocell, the upper ends of the light guides being aligned respectively with the circles along the margin of the film and therefore also aligned with the said light sources which are disposed above the film, and FIG. 4 is a schematic view of electrical circuitry showing how a student's selection among a number of button switches associated with multiple choice answers to a question is effective to cause film transport means to move the teaching film when a correct answer selection is made and to record in each instance whether a correct or an incorrect answer selection has been made.

In the embodiment of the invention described herein the teaching film 10 used is prepared by standard photographic production methods well known in the motion picture industry and therefore economical. No electrical or mechanical additions are made to the film; mechanical holes can be punched if desired although this would be less practical and more expensive. The viewer 12 has a door 14 for admitting film magazine 16 and automatically positioning it for transport of the teaching film without additional threading by transport means, not shown in detail since it may be means well known in the motion picture projection art.

The viewer 12 has a window 18, preferably comprising a magnifying lens, under which the film is exhibited to the student. The transport means by which the film is moved comprises standard electrical-mechanical means indicated generally by the number 20 in FIG. 4. The transport means 20 drives a gear $g^1$ which engages a gear $g^2$ attached to sprocket means 22 which engages perforations $p$ provided along one or both edges of film 10 for moving the film. When a stop space S in the left margin of the film passes under the light source L, light passing through space S energizes photocell PC which is connected through amplifier A with the latching relay LR which is connected in series with the power source 36 and the transport means 20 and serves to stop the transport of the film.

On the film along its right hand margin as shown, are a series of groups of areas or circles 24, each group comprising as many areas 24 as there are answer choices A, B, C, D, visible through window 18. One area in each group is clear enough to permit light to be transmitted through it.

Above the film, along its right hand margin, are a number of light sources 28 corresponding in number to the number of answer choices A, B, C, D, and so also to the number of film areas shown as circles 24 related to each question and answer. The stop opening S along the left hand margin of the frame is located so that when the film stops for answer selection by the student a series of areas 24 along the right hand margin will be positioned below and in vertical alignment with the light sources 28 respectively.

Extending up through the top of the viewer, are a number of switch buttons 26 equal in number to the number of multiple choice answers exhibited through the window 18 and thus equal to the number of light sources 28. In the drawings four switch buttons A, B, C, D are shown which all relate respectively to the answers A, B, C, D on the film. As will be seen from FIG. 4 each button 26 is a button switch connected in series with a source of light 28. Each time a student depresses a button 26 to indicate an answer selection a circuit is closed through a source of light 28 disposed on one side of the film 10 being exhibited and the solenoid 44 controlling the actuation of marker means 46 is actuated. On the other side of the film from the light sources 28 are a number of light guides 30, equal in number to the light sources, and all leading to a photocell 32, which is connected through amplifier 38 to the solenoid 40. The core of solenoid 40 carries the arm 41 which is connected to the marking means 48 and moves it when a correct answer selection is made, so that the marking for a correct answer is different from and can be distinguished from the marking which indicated an incorrect answer selection.

It will be noted that of the circles 24 along the margin of each frame on the film only one, indicated as 24a, is cut out or transparent and that is the one which is associated with the correct answer. Therefore when a correct answer button 26 is selected and depressed the light from the actuated light source 28 will be directed through the space or circle 24a and will reach the photocell 32 through the opposed light guide 30. When a button 26 which corresponds with an incorrect answer is depressed it will actuate a light source 28 but the circle or area on the film aligned with the light source will be opaque and therefore no light passes through the opposed light guide 30 to stimulate the photocell 32, but nevertheless solenoid 44 controlling the marking means will be actuated because it is in series with the button-light circuit.

The amplifier 38 is normally in a passive condition and does not pass current to solenoid 40, allowing its lever 41 and slide 48 to be in the position shown, with "incorrect" marking 43a in position to be stamped upon the card 50 by solenoid 44 and its armature 46 when solenoid 44 is actuated by pushing any button but the correct one.

The correct button allows light to pass through 24a to the photocell 32 via light conductors 30 and activates amplifier 38, thereby allowing current to flow to solenoid 40 and retracting lever 41 and slide 48, thus placing the "correct" marker 48b in position to be imprinted on card 50 by solenoid 44.

At the same time current is passed to latching relay LR to unlatch it and allow the transport mechanism 20 to advance the film. Removal of light to 32 returns 38 to a passive condition and allows 48 to return to the position shown for a repetition of the cycle.

In the electric circuitry indicated in FIG. 4 power is provided from a source indicated by the number 34 through the transformer 36.

The student will learn by the restarting of movement of the film in response to his button selection when he has selected the correct answer. Light means could also be added in tandem for visual notification. If desired the latching relay LR can also be made to reverse the film to a previous frame for additional instruction when a wrong button is pushed. For purposes of home instruction, where the distant school wishes to keep an accurate record of the student's progress a card 50 can be inserted into the film viewer in the indicated slot. Each time the student makes an answer selection the card 50 is marked or punched, the mark or punch for a correct answer being distinguishable from the mark or punch for an incorrect answer. This card may then be signed by the student and returned to the school. As shown herein a card 50 is marked or punched in one place for each answer and is advanced for marking each subsequent answer on a succeeding line. Lever arm 41 is connected to the core of solenoid 40 and changes the position of the marking means 48 which carries the two marking or punching means 48a and 48b so that when a correct answer selection is made and both solenoid 40 and 44 are operated the resulting marking will differ from the marking for an incorrect answer.

In order to get the maximum amount of teaching matter into each film it is proposed to have the type greatly reduced and then enlarged by optical projection as is done with microfilm.

There has thus been provided a system and means in which the objects stated above are accomplished in a thoroughly practical way.

What I claim is:

1. A teaching device comprising a film having thereon a question and multiple answers therefor, a viewer adapted to receive the film and having a window through which successive portions of the film can be seen, transport means for moving the film, said film having an opening through one edge portion thereof, a first light source and a first photocell at opposite sides of the film in line for light from the source to pass through said opening and energize the photocell when the film moves to a position in which a question and answers therefor are presented under the window, means actuated by the first photocell to stop the film transport means when the first photocell is energized, said film having a series of areas along another edge portion equal in number to the multiple answers and similarly related to the answers respectively, the areas related to incorrect answers being opaque and the areas related to correct answers being translucent second light sources at one side of the film to be in alignment respectively with the areas related to a set of answers as the latter are presented under the window, means for selectively actuating said second light sources, a second photocell, light conduits at the opposite side of the film from the second light sources extending to the second photocell respectively from points aligned with said areas and with said light sources, whereby, when one of the second light sources aligned with a translucent area representing a correct answer is actuated, the second photocell is energized, a score card, marking means actuated by the energizing of the second photocell for moving the marking means to make a mark on the card indicating a correct answer.

2. The teaching device of claim 1 which includes means actuated by the energizing of the second photocell to start the film transport means, whereby, the film transport means is started when one of the second light sources indicating a correct answer is actuated.

3. The teaching device of claim 1 in which said means actuated by the first photocell to stop the film transport means is a latching relay and in which said second photocell is connected to actuate said latching relay to start the transport means when the second photocell is energized.

4. The teaching device of claim 1 which includes means actuated by actuation of any of said second light sources for moving the marking means into marking engagement with the score card, said marking means having two marking elements thereon and being shiftable from one position in which one of the marking elements is in line to make a mark on the card by said movement of the marking means to a second position in which the other marking element is in line to make a mark on the card by said movement of the marking means, and means actuated by the energized second photocell for shifting the marking means to said second position whereby a mark is always made on the card by actuation of one of the second light sources and the mark that is made indicates whether the answer indicated thereby is correct or incorrect.

5. The teaching device of claim 4 in which the means respectively for moving and for shifting the marking means are solenoids.

References Cited

UNITED STATES PATENTS

| 2,402,162 | 6/1946 | Holt | 35—9 X |
| 3,100,351 | 8/1963 | Priednieks et al. | 35—9 X |
| 3,117,382 | 1/1964 | Schutzberger et al. | 35—9 |
| 3,137,948 | 6/1964 | Wyckoff | 35—9 |
| 3,191,315 | 6/1965 | Hannah | 35—9 |
| 3,395,464 | 8/1968 | Leslie et al. | 35—9 |

FOREIGN PATENTS 1,061,392  3/1967  Great Britain.

EUGENE R. CAPOZIO, Primary Examiner

J. H. WOLFF, Assistant Examiner